June 3, 1952        G. A. HENRY        2,599,176

SEMIPNEUMATIC TIRE FOR TOY VEHICLES

Filed May 24, 1947

INVENTOR.
GILBERT A. HENRY
BY
AGENT.

Patented June 3, 1952

2,599,176

UNITED STATES PATENT OFFICE 2,599,176

SEMIPNEUMATIC TIRE FOR TOY VEHICLES

Gilbert A. Henry, Burbank, Calif.

Application May 24, 1947, Serial No. 750,310

1 Claim. (Cl. 152—330)

My invention relates to pneumatic tires for small toy vehicles such as airplanes and automobiles, and more particularly to a true semipneumatic tire.

Toy vehicles of the type to which my invention applies are generally provided with wheels including small tires. In order to reduce effects of shock on such vehicles in the event if impact due to falling or impact in riding over rough portions of a road, it is highly desirable that tires of resilient construction be employed. Solid rubber tires are unsatisfactory for this purpose, either because they are too hard to serve their purpose or else because they wear too readily if soft enough to serve their purpose. They are also unsatisfactory for use on toy vehicles because of their weight. Hollow rubber tires of the type generally used on automobiles have not proved entirely satisfactory, particularly because the maximum benefit from their use can only be obtained by employing inner tubes. The cost of such an arrangement usually renders its use undesirable with toy vehicles. In any event the employment of tires which require inflation are not very convenient for use on small toys.

Accordingly, an object of my invention is to provide a toy wheel construction employing a hollow rubber tire in which air is sealed without the use of an inner tube.

A further object of my invention is to effect the sealing of air in a hollow rubber tire by holding separate opposed inner portions thereof pressed together.

A still further object of my invention is to provide a wheel construction employing a hollow rubber tire wherein the inner ends thereof are sealed by means of two discs held together with a sleeve bearing.

The foregoing objects of my invention, together with the advantages thereof, will be more clearly understood by referring to the following description and the accompanying drawing in which.

Figure 1:
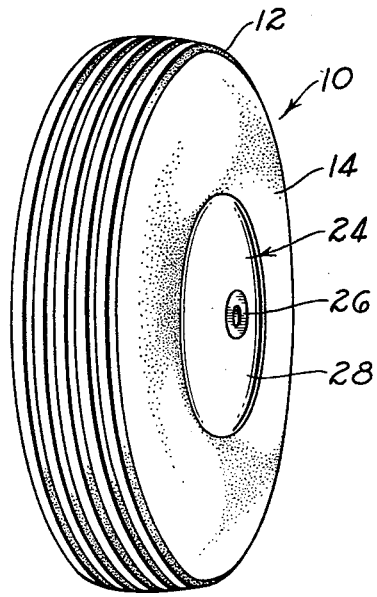
Figure 1 is a perspective view of a wheel embodying features of my invention.
Figure 2:
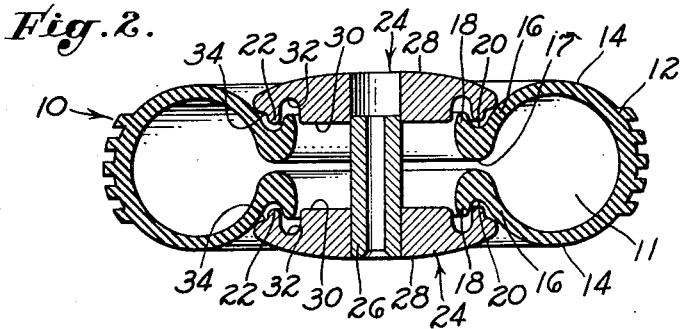
Fig. 2 is a sectional view of the various parts of the wheel in course of assembly.

Referring to the drawing wherein one embodiment of my invention is illustrated, the tire 10 is of circular configuration embracing an annular air space 11. The tire 10 is composed of rubber or like resilient material and is of sufficient thickness to provide a stiff-wall construction. By a tire having stiff-wall construction, I means a tire which has self-supporting walls and which therefore does not lose its shape unless subjected to external forces which are large compared to the weight of the tire. Small tires useful on toy vehicles generally have diameters between about two to about eight inches.

The outer or peripheral wall section 12 of the tire 10 is preferably provided with a tread and the side walls 14 are preferably smooth. The inner portions 16 of the side walls stand in opposed relation and are separated by an annular slot 17 therebetween which provides access from the air space 11 to the atmosphere when the tire is unmounted. The inner two inner portions 16 of the side walls 14 are provided with annular beads 18 which extend outwardly therefrom and define the inner sides of two annular channels or grooves 20.

According to my invention the effective stiffness of the tire 10 is increased by sealing air in the air space 11 thus providing a true semi-pneumatic tire. The sealing is accomplished by closing the annular slot 17 tightly, preferably by holding the two inner portions 16 of the side walls 14 together under compression.

Figure 3:
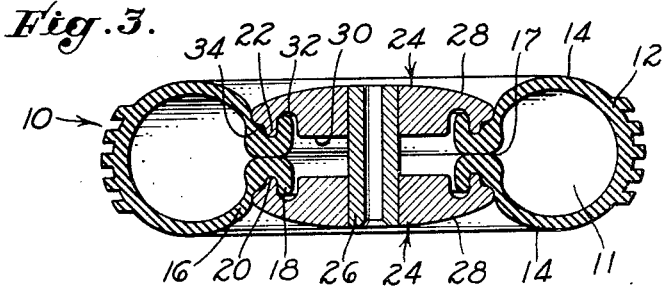
Fig. 3 is a sectional view of the assembled wheel.

The closure of the annular slot 17 is accomplished by means of ring members such as axial flanges 22 arranged at the outer edges of two discs 24. The discs 24 are rigidly secured together by being press fit on a sleeve 26, as illustrated in Fig. 3. The sleeve 26 serves as a wheel bearing. The outer surfaces 28 of the discs are preferably made convex for the sake of appearances while the inner surfaces 30 are preferably flat for economy of construction. Each flange 22 is preferably formed in each disc 24 between an annular groove 32 in its inner surface 30 and an annular step 34 concentric therewith at the outer edge of the disc. The outer ends of the sleeve 26 are preferably flush with the outer surfaces of the discs 24.

The discs 24 are preferably made from a lightweight, non-corrosive metal such as aluminum and the sleeve 26 is preferably made from tubular stock composed of bronze or brass.

In assembling the wheel, one disc 24 is first pressed on one end of the sleeve 26. These parts are then placed in position on the lower side of a tire 10 and the other disc 24 is then pressed onto the sleeve 26 to form the desired seal between the inner portions 16 of the side walls 14.

Preferably the axial flanges 22 are pressed tightly into the channels 20, thereby pressing the inner portions 16 of the side walls together tightly, the sleeve 26 preferably being cut in advance to the proper length to facilitate this operation. It is to be noted that, in the form of the invention illustrated, the outer edges of the annular beads 18 do not press against the bases of the grooves 32, the beads serving merely to prevent relative axial movement of the inner portion of the tire relative to the discs 24.

The air thus sealed in the air space 11 serves to increase the effective strength or resilience of the tire.

While there may be a slight leakage of air between the two abutting portions 16 of the side walls which seal the air space 11 and between the axial flanges 22 and the channels 20, this air leakage is so slow that for all practical purposes the tire acts as a pneumatic tire in which air is sealed at about atmospheric pressure.

Having now described a wheel construction employing a semi-pneumatic tire in which the objects of my invention are attained, reference is made to the following claim wherein the limits of my invention are defined.

I claim:

A semi-pneumatic wheel structure for use on small toy vehicles comprising a unitary hollow tire composed of rubber-like material having resilient imperforate self-supporting walls embracing an air space and having a pair of separate opposed annular wall portions at the inner edge thereof said opposed annular wall portions being adapted to contact each other throughout their entire circumferences said annular wall portions being provided with external annular grooves coaxial with the outer circumference of said tire, a pair of discs having axial flanges engaging said grooves, said discs having coaxial bores therein, and a sleeve bearing pressed in said bores for clamping said flanges in said grooves whereby said wall portions are pressed together throughout their circumferences to form an air seal therebetween.

GILBERT A. HENRY.

REFERENCES CITED

The following references are of record in the file of this patent:

UNITED STATES PATENTS

| Number | Name | Date |
|---|---|---|
| 619,141 | Craig | Feb. 7, 1899 |
| 800,308 | DeLaski et al. | Sept. 26, 1905 |
| 1,035,424 | Rice | Aug. 13, 1912 |
| 1,965,058 | Seabra | July 3, 1934 |
| 2,044,654 | Whited | June 16, 1936 |
| 2,189,464 | Frisbie | Feb. 6, 1940 |

FOREIGN PATENTS

| Number | Country | Date |
|---|---|---|
| 3,372 | Great Britain | 1896 |